(No Model.)

F. E. BAKER.
TEA POT AND COFFEE POT HANDLE.

No. 347,021. Patented Aug. 10, 1886.

Witnesses:
E. W. Stuart
Dayton A. Doyle

Inventor:
Frank E. Baker,
by C. P. Humphrey
Atty

UNITED STATES PATENT OFFICE.

FRANK E. BAKER, OF AKRON, OHIO.

TEA-POT AND COFFEE-POT HANDLE.

SPECIFICATION forming part of Letters Patent No. 347,021, dated August 10, 1886.

Application filed November 30, 1885. Serial No. 184,256. (No model.)

*To all whom it may concern:*

Be it known that I, FRANK E. BAKER, of the city of Akron, in the county of Summit and State of Ohio, have invented a new and useful Improvement in Tea-Pot and Coffee-Pot Handles, of which the following is a specification.

My invention is an improvement in that class of wood tea-pot and coffee-pot handles which consists of two wooden posts, each connected by a metallic flange with the pot, and a wooden handle transverse to and connected with the outer ends of said posts. Heretofore such handles have been constructed with the two posts entering sockets both in the handle and flanges, the parts being held together by rivets, which extend from the flanges through the axes of the posts to the outside of the handles. This mode of construction is objectionable, because the rivets tend to convey heat from the pot to the handle and to the hand of the person holding the same.

The object of my invention is to avoid the foregoing objection.

It consists in the devices illustrated in the accompanying drawings, as hereinafter described, and specifically claimed, in which said drawings—

Figure 1:
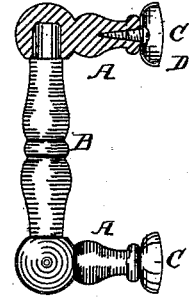
Figure 2:
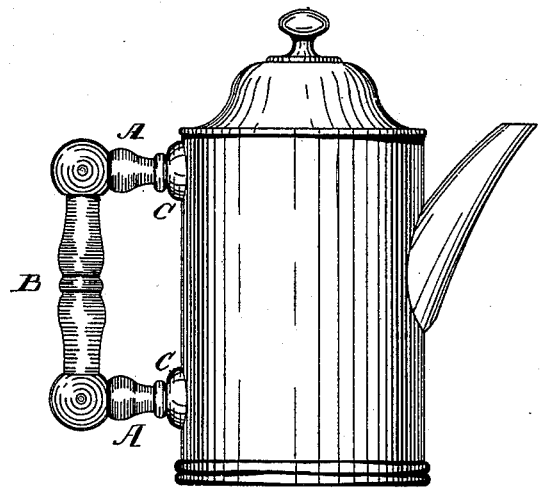
Figure 3:
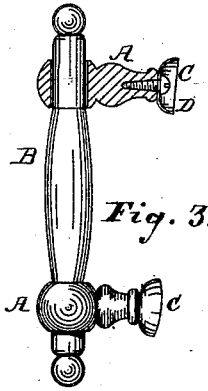
Figure 4:
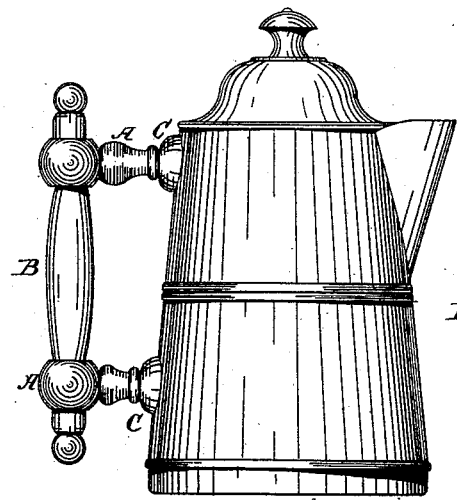

Figure 1 is a handle embodying my invention, the upper post being shown in central vertical section. Fig. 2 is a pot having straight sides and provided with the handle shown in Fig. 1. Fig. 3 is a handle slightly modified from the form shown in Fig. 1, and Fig. 4 is a pot with sloping sides provided with a handle of the form shown in Fig. 3.

In each form the posts A have a transverse hole at their outer ends in which the ends of the handle B rest. In the form shown in Fig. 1 the hole does not extend entirely through the post A, and hence the handle B does not show above it. In the form shown in Fig. 3 the handle extends through the posts. When constructed, they are coated with any siccative varnish, and then baked in an oven until the entire surface is covered with a firm enamel. To enable them to be attached to the pot, flanges C are attached to the ends of the posts by screws D. By this construction I secure an absolutely cold handle, the wood posts being non-conductors and having no rivets to convey the heat.

I claim—

The combination, in a handle for vessels for heated liquids, of the posts A A, each having at one end the flanges C C, connected by screws D D, less in length than said posts, and having at their other ends transverse orifices, with the handle B, the ends of which enter and rest in said orifices, said posts and handle being coated with enamel, substantially as shown, and for the purpose specified.

In testimony that I claim the foregoing I have hereunto set my hand this 8th day of October, A. D. 1885.

FRANK E. BAKER.

Witnesses:
E. W. STUART,
C. P. HUMPHREY.